US008468788B1

(12) United States Patent
Vastag

(10) Patent No.: US 8,468,788 B1
(45) Date of Patent: Jun. 25, 2013

(54) LAWN MOWER SYSTEM

(76) Inventor: Laszlo Vastag, Stamford, NY (US)

( * ) Notice: Subject to any disclaimer, the term of this patent is extended or adjusted under 35 U.S.C. 154(b) by 0 days.

(21) Appl. No.: 12/931,215

(22) Filed: Jan. 27, 2011

(51) Int. Cl.
    *A01D 34/00* (2006.01)
(52) U.S. Cl.
    USPC ............... 56/17.5; 56/320.1; 56/320.2
(58) Field of Classification Search
    USPC ......... 56/17.5, 17.3, 17.2, 13.1, 11.3, 16.9, 56/17.4, 12.1, 256, 255, 320.1, 320.2, 295, 56/12.7, DIG. 20, DIG. 24, DIG. 9
    See application file for complete search history.

(56) References Cited

U.S. PATENT DOCUMENTS

| | | | | |
|---|---|---|---|---|
| 2,578,880 A * | 12/1951 | Doyle | | 56/17.2 |
| 3,050,925 A * | 8/1962 | West et al. | | 56/295 |
| 3,764,156 A * | 10/1973 | Nepper et al. | | 280/47.36 |
| 4,466,232 A * | 8/1984 | Beugelsdyk et al. | | 56/10.8 |
| 4,466,235 A * | 8/1984 | Cole | | 56/16.9 |
| 5,284,007 A * | 2/1994 | Poe et al. | | 56/320.2 |
| 5,491,964 A * | 2/1996 | Butler | | 56/320.2 |
| 5,826,417 A * | 10/1998 | Evans | | 56/320.2 |
| 6,178,729 B1 * | 1/2001 | Vastag | | 56/17.5 |
| 6,644,002 B2 * | 11/2003 | Trefz | | 56/10.8 |
| 7,313,902 B1 * | 1/2008 | Eavenson et al. | | 56/13.6 |
| 7,574,851 B1 * | 8/2009 | McLean et al. | | 56/192 |

* cited by examiner

*Primary Examiner* — Thomas B Will
*Assistant Examiner* — Mai Nguyen

(57) ABSTRACT

A deck having a horizontally oriented top wall and a vertically oriented side wall and an opened bottom. The deck has a front and a back. A pair of front wheels extend from the side wall adjacent to the front. A pair of rear wheels extending from the side wall adjacent to the rear. An open front is formed in the side wall forwardly of the front wheels. An open side is formed in the side wall laterally between a front and adjacent rear wheel. An open rear is formed in the side wall rearwardly of the rear wheels. A motor is mounted in a central region of the deck with a rotatable drive shaft extending vertically downwardly therefrom. A rotatable blade is mounted on the drive shaft.

4 Claims, 8 Drawing Sheets

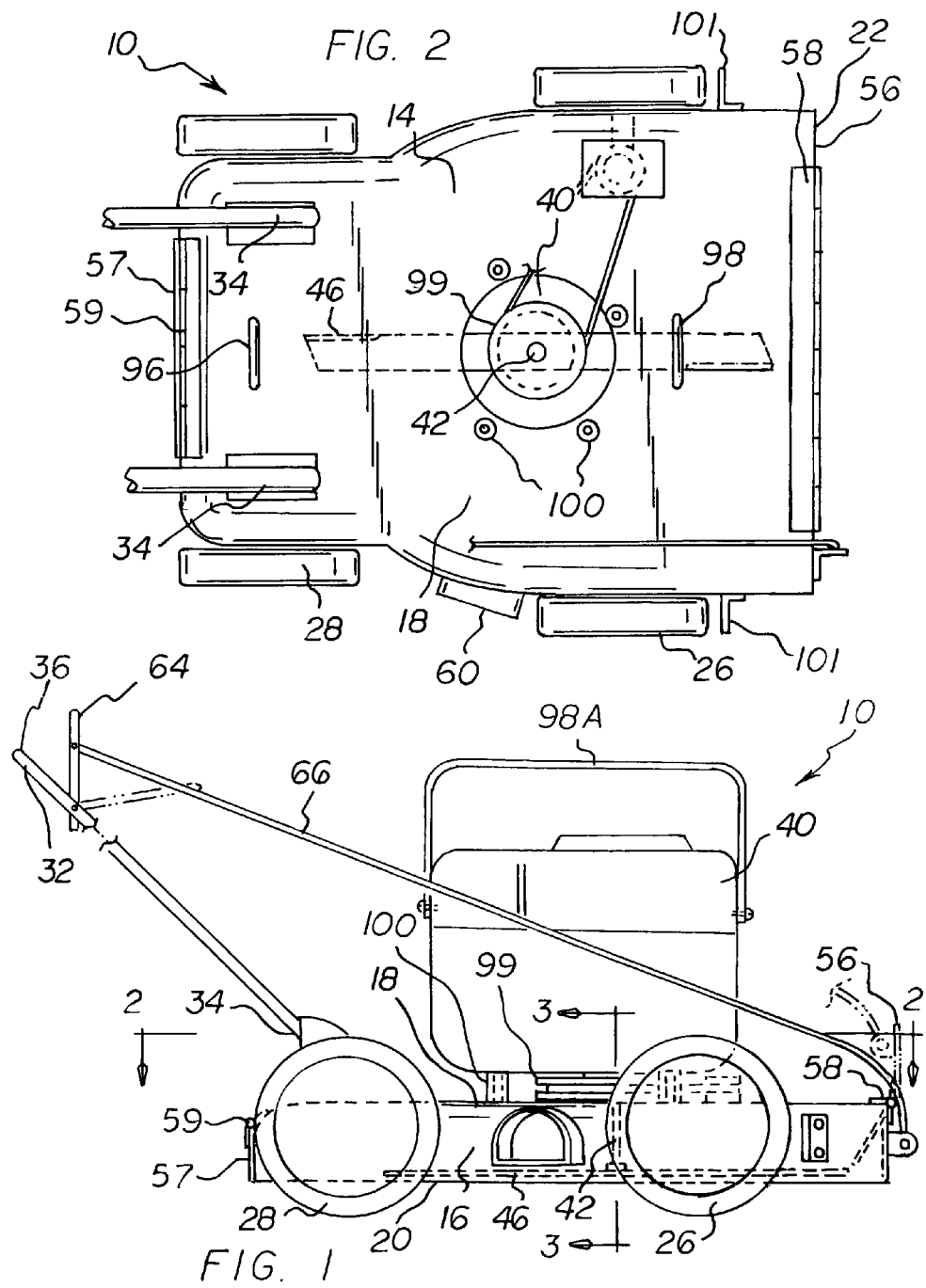

FIG. 5
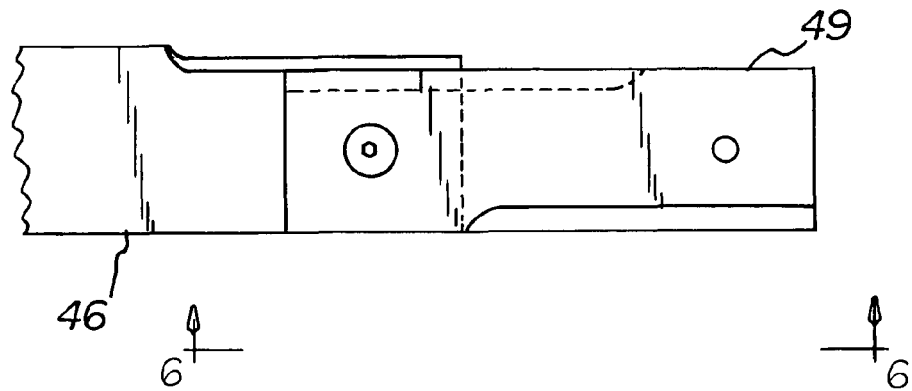
FIG. 6
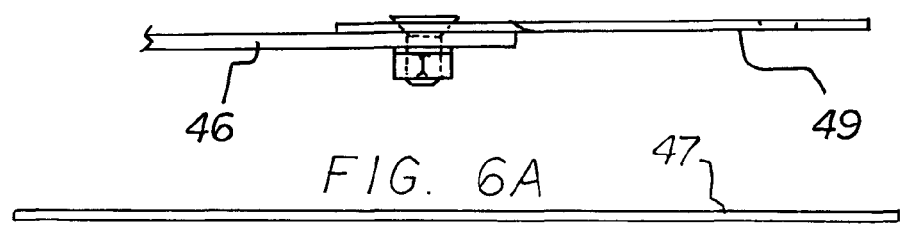
FIG. 6A
FIG. 6B
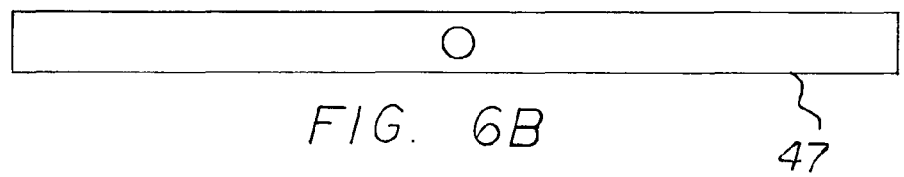
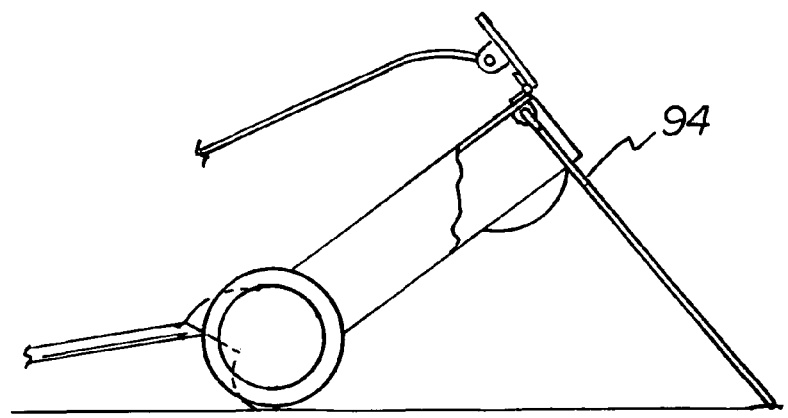
FIG. 7

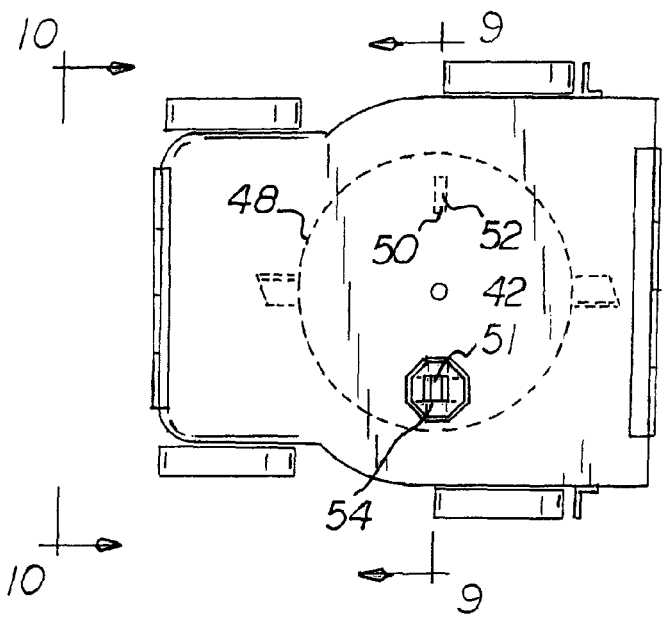
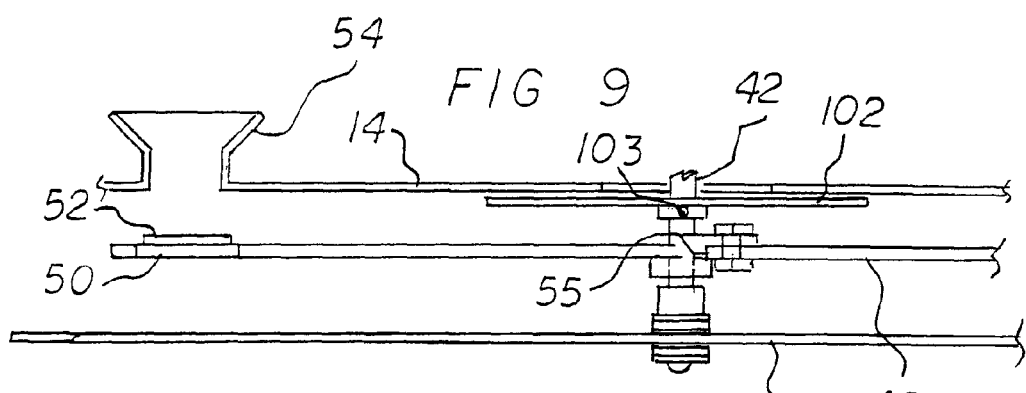
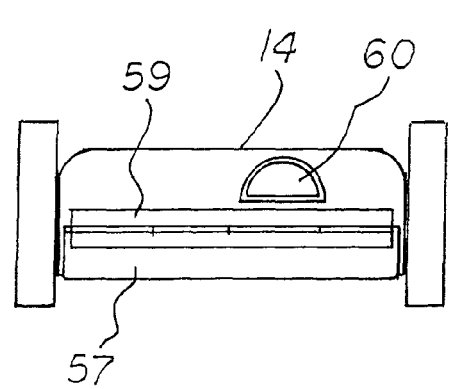
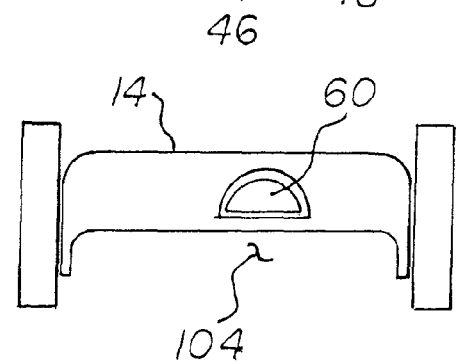

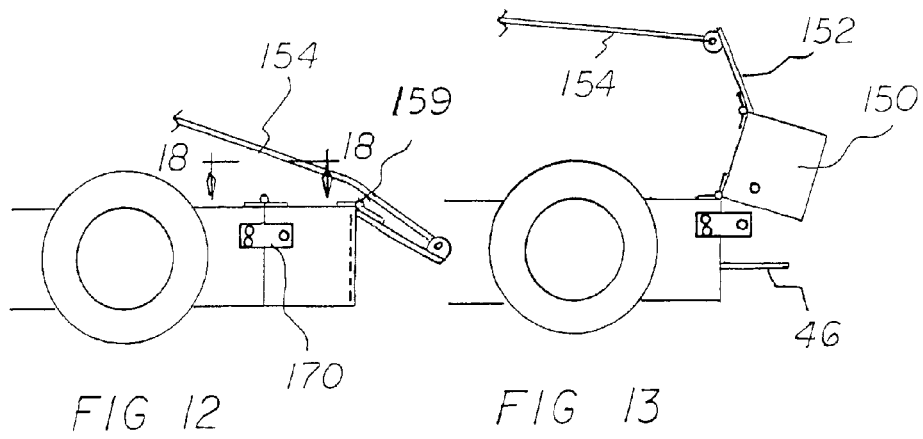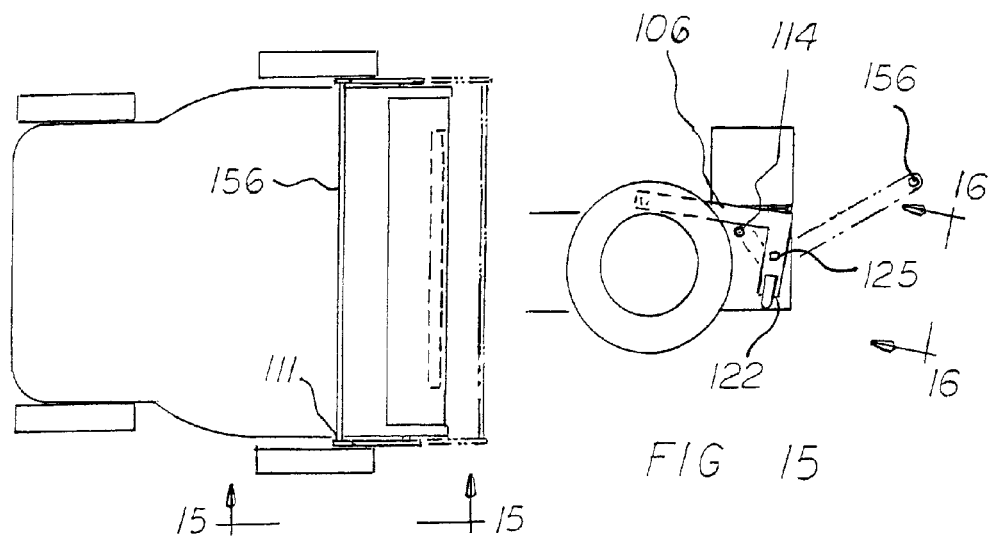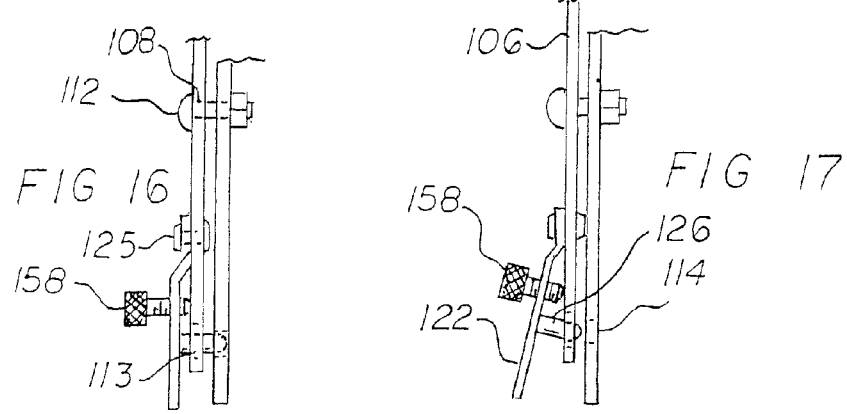

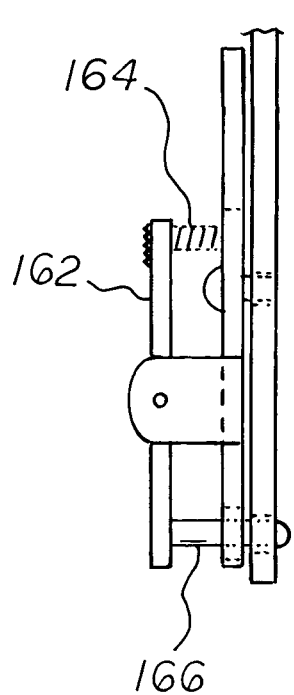
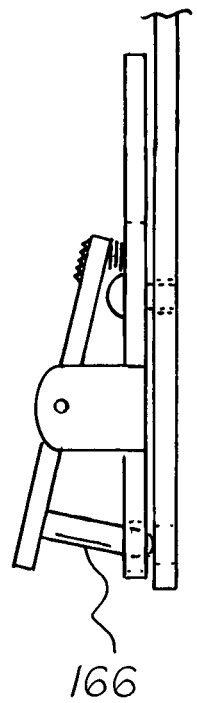
FIG 16A    FIG 17A
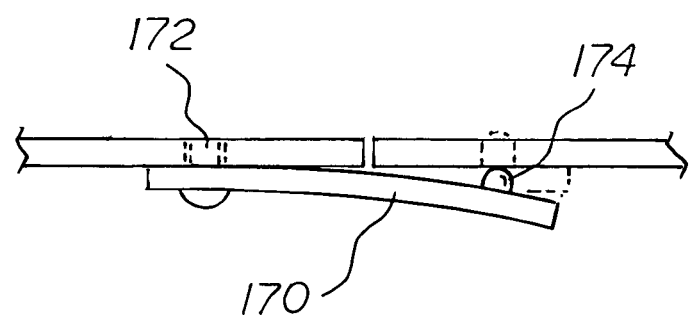
FIG 18

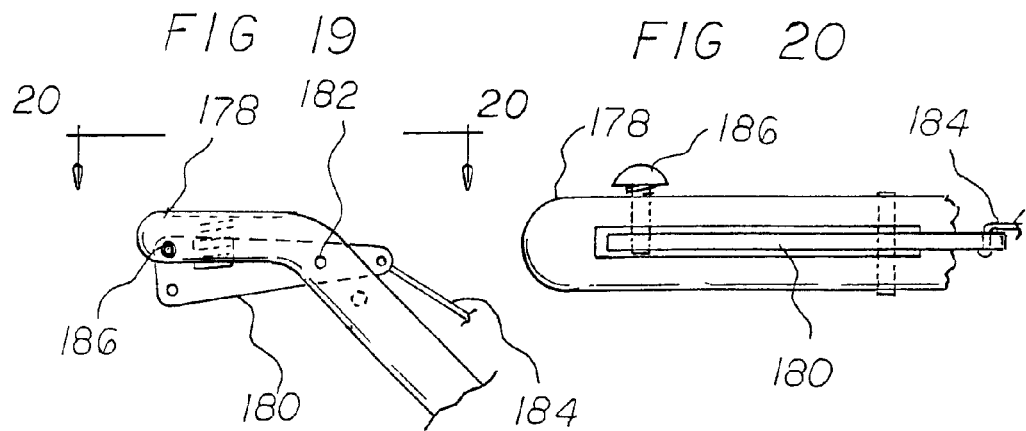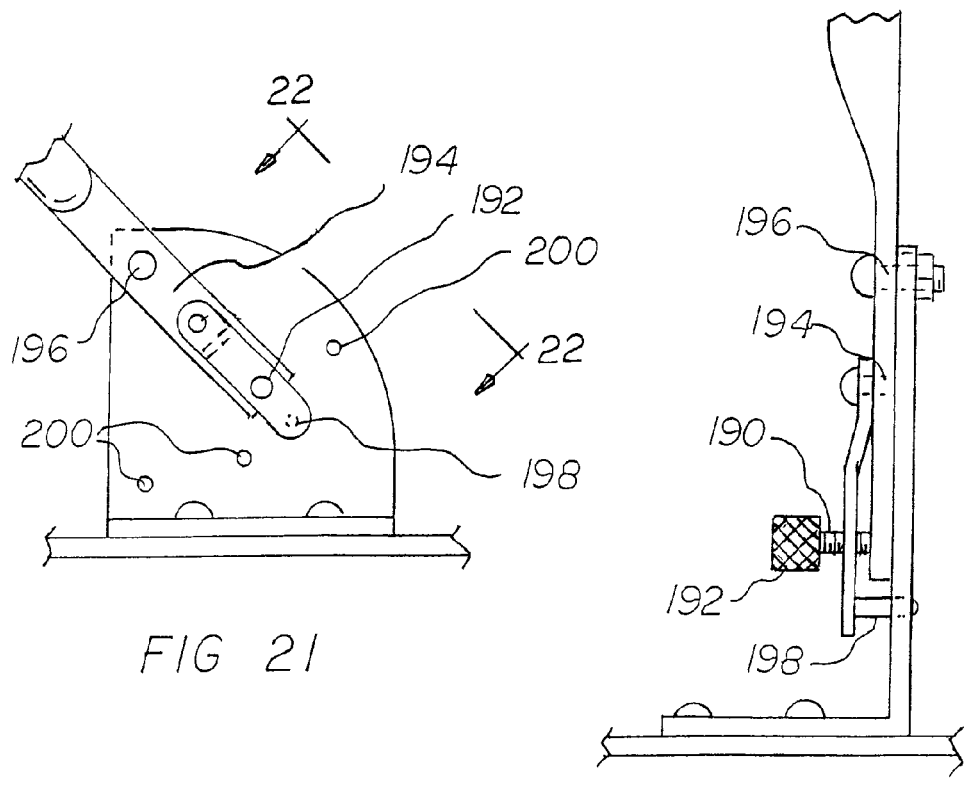

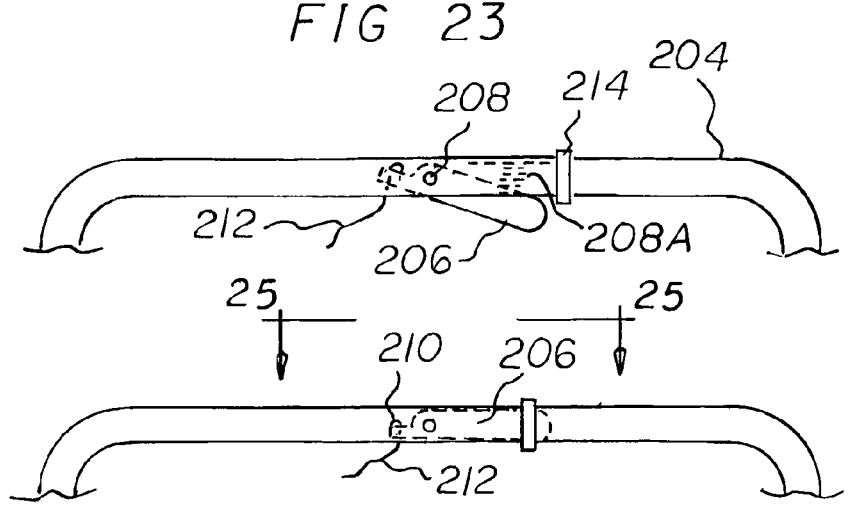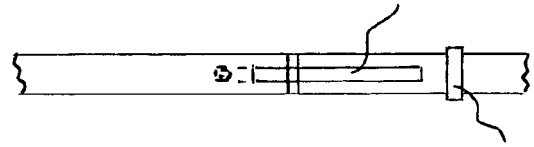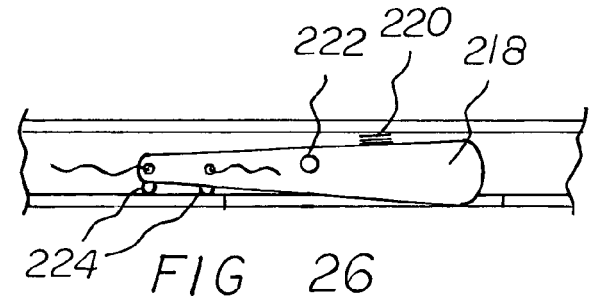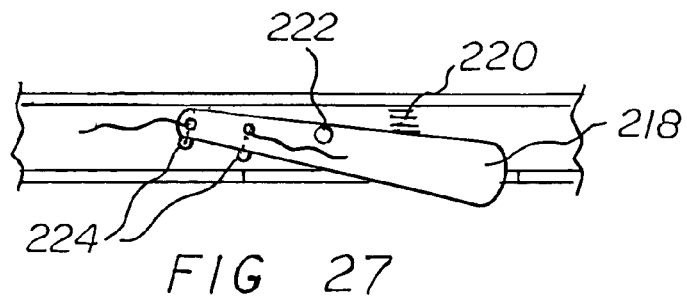

LAWN MOWER SYSTEM

BACKGROUND OF THE INVENTION

1. Field of the Invention

The present invention relates to a lawn mower system with a deck formed with a trap door and more particularly pertains to cutting grass, vegetation, brush, bushes, foliage and the like with a lawn mower adapted to be configured for varying heights of material being cut at the discretion of the user and wherein the system also chips larger pieces of brush and the like.

2. Description of the Prior Art

The use of lawn mowers of known designs and configurations is known in the prior art. More specifically, lawn mowers of known designs and configurations heretofore devised and utilized for the purpose of cutting grass and foliage of varying heights through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 2,578,880 to Doyle discloses a Rotating Cutting Disk type Mower. U.S. Pat. No. 4,887,418 to Pelletier discloses an Apparatus for Mowing, Chipping and Blowing. U.S. Pat. No. 4,633,658 to Nogawa discloses a Lawn Mower. U.S. Pat. No. 4,466,235 to Cole discloses a Rotary Mower. Lastly, U.S. Pat. No. 3,851,452 to Brocas discloses Guarded Rotary Mowers.

While these devices fulfill their respective, particular objectives and requirements, the aforementioned patents do not describe lawn mower system with a deck formed with a trap door as disclosed herein.

In this respect, the lawn mower system with a deck formed with a trap door according to the present invention substantially departs from the conventional concepts and designs of the prior art, and in doing so provides an apparatus primarily developed for the purpose of cutting grass and foliage with a'lawn mower adapted to be configured for varying heights of grass and foliage at the discretion of the user.

Therefore, it can be appreciated that there exists a continuing need for a new and improved lawn mower system with a deck formed with a trap door which can be used for cutting grass and foliage with a lawn mower adapted to be configured for varying heights of grass and foliage at the discretion of the user and also chips larger pieces of brush and the like. In this regard, the present invention substantially fulfills this need.

SUMMARY OF THE INVENTION

In view of the foregoing disadvantages inherent in the known types of lawn mowers of known designs and configurations now present in the prior art, the present invention provides an improved lawn mower system with discharge components for cutting grass and foliage and operable as a function of the height of the grass and foliage to be cut. The system comprises, in combination, a deck having a horizontally oriented top wall and a vertically oriented side wall and an opened bottom, the deck having a front and a back. A pair of front wheels extend from the side wall adjacent to the front. A pair of rear wheels extend from the side wall adjacent to the rear. An open front is formed in the side wall forwardly of the front wheels. An open side is formed in the side wall laterally between a front and adjacent rear wheel. An open rear is formed in the side wall rearwardly of the rear wheels A motor is mounted in a central region of the deck with a rotatable drive shaft. The drive shaft extends vertically downwardly from a central region of the deck. A rotatable blade is mounted on the drive shaft A trap door has a hinge which couples the deck and the trap door at the open front. A handle has a pivotable lower end coupled with respect to the housing adjacent to the rear wheels. The handle has an upper handle area for manipulation by the user.

The trap door is in a box like configuration with a top face and a front face and side faces. Thus formed is an open back and open bottom. Further included a supplemental hinge coupling the top face and the front face whereby the blade extends forwardly of the deck when the trap door is fully opened.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lawn mower system with a deck formed with a trap door which has all of the advantages of the prior art lawn mowers of known designs and configurations and none of the disadvantages.

It is another object of the present invention to provide a new and improved lawn mower system with a deck formed with a trap door which may be easily and efficiently manufactured and marketed.

It is further object of the present invention to provide a new and improved lawn mower system with a deck formed with a trap door which is of durable and reliable constructions.

An even further object of the present invention is to provide a new and improved lawn mower system with a deck formed with a trap door which is susceptible of a low cost of manufacture with regard to both materials and labor, and which accordingly is then susceptible of low prices of sale to the consuming public, thereby making such lawn mower system with a deck formed with a trap door economically available to the buying public.

Even still another object of the present invention is to provide a lawn mower system with a deck formed with a trap door for cutting grass and foliage with a lawn mower system.

Lastly, it is an object of the present invention to provide a new and improved lawn mower system. The system includes a deck having a horizontally oriented top wall and a vertically oriented side wall and an opened bottom. The deck has a front and a back. A pair of front wheels extend from the side wall adjacent to the front. A pair of rear wheels extending from the side wall adjacent to the rear. An open front is formed in the side wall forwardly of the front wheels. An open side is formed in the side wall laterally between a front and adjacent rear wheel. An open rear is formed in the side wall rearwardly of the rear wheels. A motor is mounted in a central region of the deck with a rotatable drive shaft extending vertically downwardly therefrom. A rotatable blade is mounted on the drive shaft.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the new and improved lawn mower system constructed in accordance with the principles of the present invention.

FIG. 2 is a cross-sectional view taken along line 2-2 of FIG. 1.

FIG. 5 is a top view of a central portion of the blade illustrated in the prior Figures.

FIG. 6 is a partial side elevational view taken along line 6-6 of FIG. 5.

FIGS. 6A and 6B are edge and plan views of a blade constructed in accordance with an alternate embodiment of the present invention.

FIG. 7 shows the mower system in a tipped orientation as for cleaning.

FIG. 8 is a plan view of a deck illustrating an alternate embodiment of the invention.

FIG. 9 is a cross-sectional view taken along line 9-9 of FIG. 8.

FIGS. 10 and 11 are rear elevational views taken along line 10-10 of FIG. 8 illustrating alternate embodiments.

FIGS. 12 and 13 are side elevational views of the front of the deck illustrating the front door in the closed and open orientations.

FIG. 14 is a plan view of the front of the deck illustrating a front door of an alternate embodiment in the open orientations.

FIG. 15 is a side elevational view taken along line 15-15 of FIG. 14.

FIGS. 16 and 17 are front elevational views taken along line 16-16 of FIG. 15 illustrating locked and unlocked orientations.

FIGS. 16A and 17A are front elevational views taken along line 16-16 of FIG. 15 but illustrating alternate embodiments of the invention.

FIG. 18 m is a cross sectional view taken along line 18-18 of FIG. 12.

FIG. 19 is a side elevational view of one side of the handle illustrating the front door controls.

FIG. 20 is a plan view of the handle taken along line 20-20 of FIG. 19.

FIG. 21 is a side elevational view of one side of the lower end of the handle for varying the angle of the handle.

FIG. 22 is a plan view of the handle taken along line 22-22 of FIG. 21.

FIGS. 23 and 24 are front elevational views of the upper end of the handle illustrating an emergency shut off in the open and closed orientations.

FIG. 25 a plan view of the handle taken along line 25-25 of FIG. 24.

FIGS. 26 and 27 are front elevational views of the upper end of the handle illustrating an emergency shut off of an alternate embodiment of the invention.

The same reference numerals refer to the same parts throughout the various Figures.

DESCRIPTION OF THE PREFERRED EMBODIMENT

Figure 3:
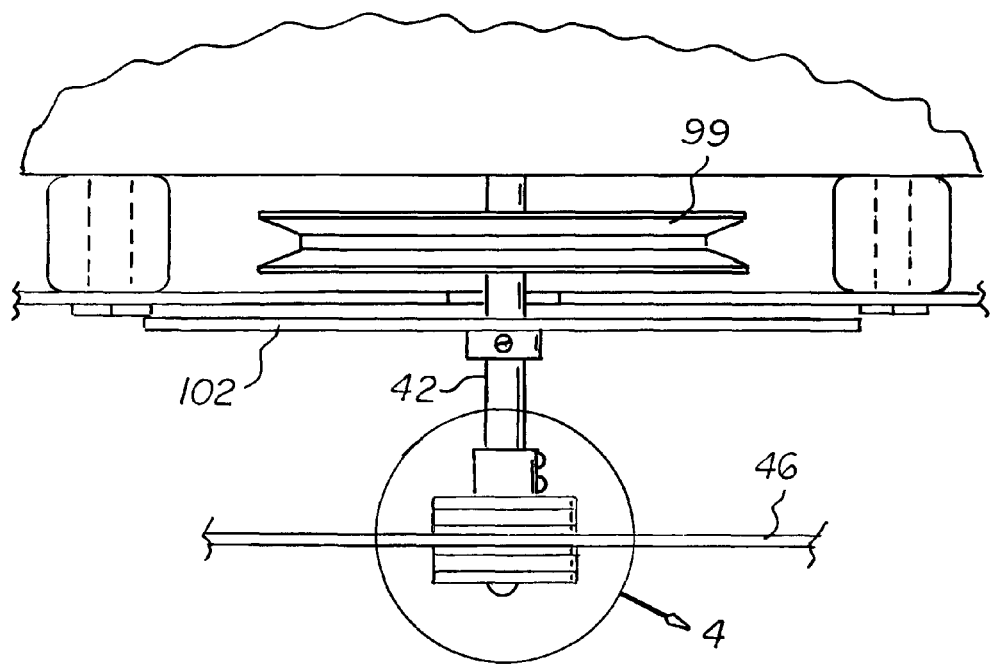
FIG. 3 is a cross-sectional view of the slip clutch taken along line 3-3 of FIG. 2.

With reference now to the drawings, and in particular to FIG. 1 thereof, the preferred embodiment of the new and improved lawn mower system with a deck formed with a trap door embodying the principles and concepts of the present invention and generally designated by the reference numeral 10 will be described.

The present invention, the lawn mower system with a deck formed with a trap door, is comprised of a plurality of components. Such components in their broadest context include a deck, two pair of wheels, a handle, a motor, a rotatable blade, a trap door and a trigger. Such components are individually configured and correlated with respect to each other so as to attain the desired objective.

The present invention is a lawn mower system 10. The lawn mower system includes a deck having a trap door in the front for cutting grass and foliage and operable as a function of the height of the grass and foliage to be cut.

The deck 14 of the system has a generally cylindrical side wall 16. The side wall has a vertical axis. A top wall 18 is coupled to the upper edges of the side wall with an opened bottom 20. The side wall also forms an open front 22 for nearly 180 degrees of its extent.

The lawn mower system also comprises two pair of wheels including a set of front wheels 26. The front wheels are generally centrally located on opposite sides of the side wall. The front wheels extend outwardly from the side wall. A pair of rear wheels 28 extend outwardly from adjacent to the rear edge of the side wall.

In front of each wheel there is preferably provided a fender 101 which is mounted on the side of the deck to prevent the grass or bush from getting stuck in between the wheels and deck or the grass to tangle on the wheel shaft which would make the whole unit hard to push. If the mower is used mainly to cut bushes, it will work better with larger or wider pneumatic rear wheels because it is going to be pushed over the bush stumps.

Also included in the lawn mower system is a handle 32 which has a pivotable lower end 34 coupled with respect to the housing adjacent to the rear edge. The handle has an upper handle area 36 for use by the user.

Further provided in the lawn mower system is a motor 40 which can be a gasoline engine or an electrical AC motor powered by AC household current or DC battery current.

The motor is mounted in a central region of the deck with a rotatable drive shaft 42 which extends downwardly therefrom. Bolts 100 provide support fo the deck.

Additionally provided is a rotatable grass cutting blade 46 that is mounted to the lower end of the drive shaft with removable couplings there between.

As shown in FIGS. 5 and 6, the grass cutting blade 46 includes an extension 49 with cutting edges on both sides. Holes in the blade and extensions with nuts and bolts allow the extension to be readily replaced with either cutting edge being utilized and allowing rotation in either direction.

A supplement can be a standard box cutter 47 which is also a supplement for the cutting blade 46, especially when it is mounted on a scaled down open front mower. It can be used as simple blue sheet steel which is very flexible, 1/32 inches by 1 inch by 12 inches. With a mounting hole in the center as seen in FIG. 6A.

A supplemental cutter wheel 48 in a circular configuration is also provided in the embodiment of FIGS. 8 and 9. The cutter wheel is located between the upper surface of the deck and the lower end of the drive shaft. The wheel has a pair of diametrically opposed apertures 50, 51 with cutting edges 52 formed therein. An opening 54 in the top wall with a funnel there above is adapted to receive material there through for being cut and chopped by the cutting edges of the wheel.

On the top of the mower deck, next to the motor and offset from the center of the deck is an opening in a shape of a funnel 54 where the bush can be pushed down. As the disk turns the bush touches the chipping cutter, chipping away the bushes. The cutting blade and the chipper blade can stay mounted on the motor shaft all the time. In the alternative, the cutting blade may be used independent of the chipper blade while the chipper blade may be used independently of the cutting blade.

Yet another component of the system is a trap door 56. The trap door has a width essentially equal to the free front upper edge of the deck with a hinge 58 coupling the deck and trap door. The trap door has a cross-sectional orientation and is adapted to be lowered to a first orientation whereby its exterior edge is essentially at the same height as the lower edge of the deck. The trap door is also adapted to be raised to a second orientation whereby the entire trap door is above the upper surface of the deck for cutting high grass and foliage.

The trap door 56 is operated by a trap door handle mounted on the U-shaped handle functioning as a trigger 64 of the mower connected through a cable 66. When the trap door handle is pulled up, the trap door opens up, exposing clear open part of the cutting blade and also acts like a shield for the motor. When the trap door handle is released, the trap door automatically closes by its own weight. The trap door handle can be operated, if so desired, together with the safety motor kill switch used on a gasoline engine, connected on the U-shaped handle or to a separate shaped handle.

Just as effective can be one handle going across the top of the mower 98A, FIG. 1, fastened to it with two screws.

The mower is provided with two handles 96, 98 mounted on the deck, one on the front and one in the rear. This is for a comfortable and safe lifting of the unit. This would be an advantage on the scaled down version of the mower whereby the unit can be lifted by one hand. Also, the mower is provided with a supporting bar 94 which swings left to right down from under the deck when the trap door is in the open position. Note FIG. 13. One end is fastened to the bottom of the deck with two screws and the other end is held by a hook, also fastened to the deck. This is in the closed position. In the closed position, the supporting bar is parallel with and adjacent to the hinge for the trap door. The purpose of this bar is for supporting the mower in a tilted position on its handle bar and two rear wheels when it is necessary to remove the blade or change the height of the mower by moving the position of the wheels higher or lower. This bar is similar to a hood supporting bar from a car.

Figure 4:
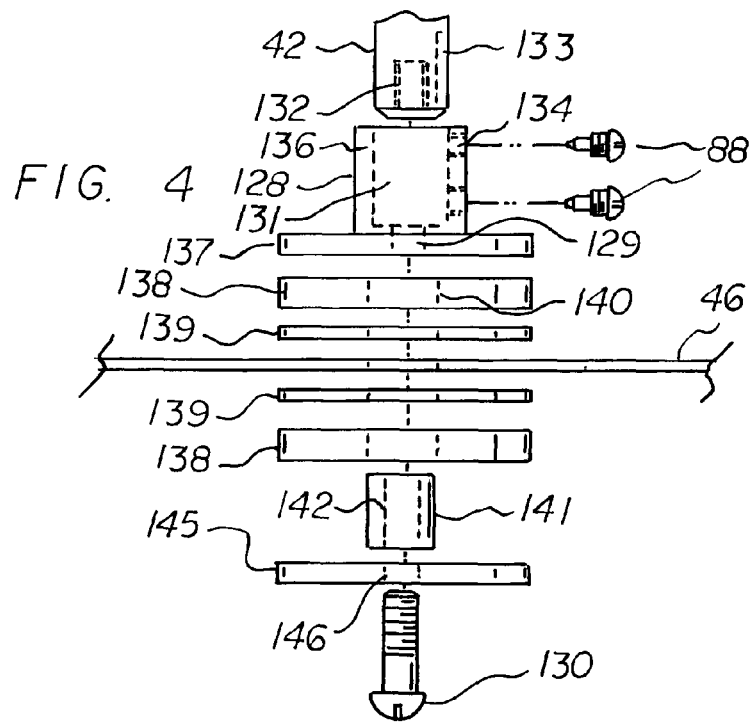
FIG. 4 is an exploded view of the slip clutch shown in FIG. 3.

Slipping type cutting blade holders are constructed as shown in FIGS. 3 and 4. When the cutting blade hits a rock stamp or anything hard, it slips spinning around in between the round plates rather than putting stress on the motor shaft.

In may be seen in the Figure, the lawn mower/bush cutter system of the present invention is a standard lawn mower which conveniently and safely cuts tall vegetation, brush and bushes and also chips larger pieces of brush and the like. It is composed of a deck on which is mounted a gasoline motor or AC, DC battery motor. It has four wheels. The two front wheels are in line with the front face of the gasoline AC, DC motor, therefore, the whole front face of the deck can open up in a form of a trap door allowing the cutting blade to stick out clearly allowing to cut inches of grass, tall vegetation and all kinds of bushes or whatever the power of the motor can handle. The cutting blade is attached to the shaft of the AC, DC gasoline motor, in the primary embodiment, with a special slipping type cutting blade holder which is essential to cut heavy bushes. Without the slipping type blade holder the motor shaft would bind creating vibration on the whole unit and would wear the whole engine prematurely. Note FIGS. 1 and 2. The grass discharge chute is part of the trap door optionally on an opening in between the rear wheels a grass discharge shut can be installed fitted with a bag to collect the cut grass.

The lawn mower system of the present invention, unlike typical lawn mowers on the market today, is capable of cutting grass, weeds and small shrubs and also chips larger pieces of brush and the like. A user is able to eliminate other lawn tools by utilizing the lawn mower system of the present invention.

FIG. 3 is a cross-sectional view of the slip clutch taken along line 3-3 of FIG. 2. The slip coupling is intermediate the drive shaft and the rotatable blade. FIG. 4 is an exploded view of the slip clutch shown in FIG. 3. In such arrangement, a vertically oriented drive shaft 42 depends from the motor. The lower end of the drive shaft has a threaded bore 132 for receiving a bolt 130. A radial slot 133 is there-adjacent. An upper collar 128 has an interior 131 fitted over the drive shaft. Side wall 136 is formed with threaded apertures 134 receiving set screws 88 for securing the collar in operative position. A spacer cylinder 141 with an unheaded bore 142 is positioned beneath the upper collar. The bolt 130 holds the spacer cylinder in operative position. On opposite sides of the spacer cylinder are discs 138, 145. There above, the blade 46 is bounded by thin plates 139. Upper discs 137, 137 between the upper collar and the thin plates and blade. Bores 140 in the plates and discs provide accommodations for the spacer cylinder. Under normal operating conditions, friction between the discs allows proper rotation of the blade. When the blade encounters an obstacle, the blades slip to preclude harm to the motor.

FIG. 5 is a top view of a central portion of the blade illustrated in the prior Figures. FIG. 6 is a partial side elevational view taken along line 6-6 of FIG. 5. The blade is formed of two sections 46, 49, each section having an interior end with an aperture and the drive shaft extend through the apertures of the two sections.

FIG. 7 shows the mower system in a tipped orientation as for cleaning. A supporting bar 94 having an interior end and an exterior end, the interior end being pivotably coupled to the housing, the exterior end rotatable between a retracted orientation adjacent to the housing and a extended orientation in contact with the ground for holding the housing tipped upwardly for cleaning purposes.

FIG. 8 is a plan view of a deck illustrating an alternate embodiment of the invention. FIG. 9 is a cross-sectional view taken along line 9-9 of FIG. 8. A rotatable chipper disk 48 with cutting slots 54 is coupled to the drive shaft intermediate the top therewith. A funnel 50 with opening 54 is formed I the deck above the slot of the disk.

FIGS. 10 and 11 are rear elevational views taken along line 10-10 of FIG. 8 illustrating alternate embodiments. In such alternate embodiments, a supplemental trap door 57 is provided with a supplemental hinge 59. The supplemental hinge couples the supplemental trap door to the rear wall of the housing. An upper rear opening and a side opening 60 between the front and rear wheels is formed in the housing. When no rear trap door is employed, a space 104 is formed in the rear of the housing.

FIGS. 12 and 13 are side elevational views of the front of the deck illustrating the front door in the closed and open orientations. The present invention provides an improved lawn mower system with discharge components for cutting grass and foliage and operable as a function of the height of the grass and foliage to be cut. The system comprises, in combination, a deck having a horizontally oriented top wall and a vertically oriented side wall and an opened bottom, the deck having a front and a back. A pair of front wheels extend from the side wall adjacent to the front. A pair of rear wheels extend from the side wall adjacent to the rear. An open front is formed in the side wall forwardly of the front wheels. An open side is formed in the side wall laterally between a front and adjacent rear wheel. An open rear is formed in the side wall rearwardly of the rear wheels A motor 40 is mounted in a central region of the deck with a rotatable drive shaft. The drive shaft extends vertically downwardly from a central region of the deck. A rotatable blade is mounted on the drive shaft.

A trap door 150 has a hinge 58 which couples the deck and the trap door 150 with a front face 152 at the open front. A handle has a pivotable lower end coupled with respect to the housing adjacent to the rear wheels. The handle has an upper handle area for manipulation by the user through cord 154.

The trap door 150 as shown in FIGS. 12 and 13 is in a box like configuration with a top face and a front face and side faces. Thus formed is an open back and open bottom. Further included is a supplemental hinge 159 coupling the top face and the front face 152. A cord 154 couples the front face with a handle component for moving the front face and front trap door between raised and lowered orientations.

FIGS. 14 and 15 illustrate an alternate embodiment wherein the handle is a bar 156 having opposed ends 111 attached directly to the trap door. An L-shaped bracket 106 is secured to each side of the box-like trap door 150 A pivot pin 125 allows the pivoting of the trap door between a lowered grass cutting orientation and a raised brush cutting orientation. Movement between such orientations is effected by a user raising and lowering the bar.

FIGS. 16 and 17 are front elevational views taken along line 16-16 of FIG. 15 illustrating the handle 156 in locked and unlocked orientations. In such embodiment, the lower end of the handle is pivotally coupled by pin 108 having a head 112. The handle is located to the side wall of the housing. A resilient pivot plate 122 is coupled to the handle by short pin 125. An adjusting pin 158 is rotatably coupled to the pivot plate for movement with the handle for adjustment purposes. A locking pin 113 extends through a handle aperture 113 and is removably received in one of a plurality of holes 114 in the side wall of the housing for locking the handle in an appropriate orientation for operation and use.

FIGS. 16A and 17A are front elevational views taken along line 16-16 of FIG. 15 but illustrating movement of a locking pin in accordance with an alternate embodiment of the invention. As may be seen, the lower end of the handle is pivotally coupled to the side wall of the housing through a pivot pin. A pivot plate 162 is coupled to the handle and urged closed by spring 164. An adjusting pin 166 is rotatably coupled to the supplemental handle for adjustment purposes, a locking pin secured to the supplemental handle and extending through the handle and the side wall for locking the handle in an appropriate orientation for operation and use.

With reference to FIG. 18, there is illustrated a locking bar 170 having a first end with a fixed pin 172 coupled to the side wall of the housing adjacent to the trap door. The locking bar has a second end with a locking pin 174 removably receivable in the side of the trap door. The box-like front door is thus adapted to be secured to the housing when not cutting brush.

FIGS. 19 and 20 illustrate a drive grip 180 pivotally about pin 182 secured to the handle 178. A drive cord 184 coupled between the drive grip and the drive belt for activating and inactivating the drive wheel. The drive wheel is powered through the motor through a pulley 99 on the drive shaft. Note FIG. 2. A pin 186 is removably received in apertures in the handle and the grip for securement purposes.

FIG. 21 is a side elevational view of one side of the lower end of the handle for varying the angle of the handle.

FIG. 22 is a plan view of the handle taken along line 22-22 of FIG. 21. This feature includes an adjustment bolt 190 with a head 192. A pivot plate 194 is secured to the lower end of the handle with the bolt 192 threadedly coupled thereto. A pivot pin 196 rotatably couples the handle to a deck bracket. Arcuately spaced holes 200 in the deck bracket selectively receive a locking pin 198 for retaining the handle in an intended orientation.

FIGS. 23 and 24 are front elevational views of the upper end of the handle 204 illustrating an emergency shut off in the open and closed orientations while FIG. 25 a plan view of the handle taken along line 25-25 of FIG. 24. In such embodiment, a safety grip 206 is pivotally secured to the handle. A safety wire 212 is coupled between the safety grip and the gasoline motor. Gravity or a push spring 208A as seen in FIG. 23 urges the safety grip to a lowered position. The safety grip is adapted to rotate around the pivot pin 208 to drop the safety wire for grounding it for automatically inactivating the gasoline motor by a user releasing the handle and safety grip. A contact 210 moves to a ground orientation in contact with the handle upon release of the safety grip and the pulling of the cord. A keeper 214 maintains the safety grip raised and the motor running when in the locked orientation of FIG. 24 as compared to FIG. 23.

FIGS. 26 and 27 are front elevational views of the upper end of the handle illustrating an emergency shut off of an alternate embodiment of the invention. In such embodiment, a safety grip 218 is pivotally secured to the handle. A safety wire is coupled between the safety grip and the motor. A spring 220 urges the safety grip to a lowered position. The safety grip is adapted rotate around the pivot pin 222 to drop and pull the safety wire from ground to open the circuit for automatically inactivating the motor upon a user releasing the handle and safety grip. A contact 224 is illustrated in the open orientation, FIG. 27, and in the closed orientation, FIG. 26.

The safety grips of FIGS. 26 and 27, with appropriate different wiring, is adapted to be utilized with a D.C. battery motor used on a scaled down version of the open front motor.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawn mower system comprising
   a deck having a horizontally oriented top wall and a vertically oriented continuous peripheral side wall and an opened bottom, the deck having a front and a back;
   a pair of front wheels extending from the side wall adjacent to the front, a pair of rear wheels extending from the side wall adjacent to the rear;
   an open front formed in the side wall forwardly of the front wheels, an open side formed in the side wall laterally between a front and adjacent rear wheel, an open rear formed in the side wall rearwardly of the rear wheels; and
   a motor mounted in a central region of the deck with a rotatable drive shaft extending vertically downwardly therefrom and a rotatable blade mounted on the drive shaft;
   a handle having a pivotable lower end coupled to the deck adjacent to the rear wheels, the handle having an upper handle area for manipulation by the user; and
   a trap door with a hinge coupling the deck and the trap door at the open front;
   wherein the trap door is in a box like configuration with a top face and a front face and side faces thus forming an open back and open bottom and further including a supplemental hinge coupling the top face and the front face.

2. The system as set forth in claim 1 and further including:
   a locking bar having a first end coupled to the side wall of the housing adjacent to the trap door, the locking bar having a second end with a locking pin removably receivable in at least one of the side faces of the trap door.

3. The system as set forth in claim 1 wherein the handle is operatively coupled to the trap door.

4. A lawn mower system with discharge components for cutting grass and foliage and operable as a function of the height of the grass and foliage to be cut comprising, in combination:
   a deck having a horizontally oriented top wall and a vertically oriented continuous peripheral side wall and an opened bottom, the deck having a front and a back;
   a pair of front wheels extending from the side wall adjacent to the front, a pair of rear wheels extending from the side wall adjacent to the rear;
   an open front formed in the side wall forwardly of the front wheels, an open side formed in the side wall laterally between a front and adjacent rear wheel, an open rear formed in the side wall rearwardly of the rear wheels; and
   a motor mounted in a central region of the deck with a rotatable drive shaft extending vertically downwardly therefrom and a rotatable blade mounted on the drive shaft;
   a handle having a pivotable lower end coupled to the deck adjacent to the rear wheels, the handle having an upper handle area for manipulation by the user; and
   a trap door with a hinge coupling the deck and the trap door at the open front;
   the trap door being in a box like configuration with a top face and a front face and side faces thus forming an open back and open bottom and further including a supplemental hinge coupling the top face and the front face whereby the blade extends forwardly of the deck when the trap door is fully opened.

* * * * *